United States Patent [19]

Popp

[11] Patent Number: 4,983,010
[45] Date of Patent: Jan. 8, 1991

[54] SYSTEM FOR CONNECTING LIGHT WAVEGUIDE BUSES AND COAXIAL CABLE BUSES

[75] Inventor: Wolfgang Popp, Darmstadt, Fed. Rep. of Germany

[73] Assignee: Licentia Patent-Verwaltungs-GmbH, Frankfurt, Fed. Rep. of Germany

[21] Appl. No.: 426,299

[22] Filed: Oct. 25, 1989

[30] Foreign Application Priority Data

Oct. 25, 1988 [DE] Fed. Rep. of Germany ....... 3836224

[51] Int. Cl.$^5$ .......................... G02B 6/26; G02F 1/00
[52] U.S. Cl. .................................. 350/96.20; 455/606; 455/601
[58] Field of Search ............... 350/96.13, 96.14, 96.16, 350/96.20; 455/601, 606, 611, 612

[56] References Cited

U.S. PATENT DOCUMENTS

| | | | |
|---|---|---|---|
| 4,742,572 | 5/1988 | Yokoyama | 455/601 X |
| 4,768,202 | 8/1988 | Lacroix et al. | 455/601 X |
| 4,781,427 | 11/1988 | Husbands et al. | 350/96.16 |
| 4,825,113 | 4/1989 | Sato et al. | 455/606 X |
| 4,847,831 | 7/1989 | Spiesman et al. | 455/601 X |
| 4,850,042 | 7/1989 | Petronio et al. | 455/606 |
| 4,908,823 | 3/1990 | Haagens et al. | 455/606 X |

Primary Examiner—John D. Lee
Assistant Examiner—Stephen W. Barns
Attorney, Agent, or Firm—Spencer & Frank

[57] ABSTRACT

A system for connecting light waveguide buses and coaxial cable buses operating according to the token passing principle. The coaxial cable buses are connected with electrical terminal access devices. An opto-electrical converter is disposed between a terminal access device and a light waveguide bus. The converter includes: a carrier band modem connected to the terminal access device and having a standardized carrier band inteface for producing data signals at the interface according to a predetermined token bus standard; an optical transceiver coupled to the light waveguide bus for converting electrical signals into optical signals and transmitting the optical signals onto the light waveguide bus and for receiving optical signals from the light waveguide bus and converting the optical signals into electrical signals; a light waveguide sub-modem having an interface coupled between the interface of the carrier band modem and the optical transceiver for generating electrical signals according to a predetermined optical token bus light waveguide standard and feeding the electrical signals to the optical transceiver and for generating electrical data signals according to the predetermined token bus standard from signals conforming to the predetermined optical token bus waveguide standard received form optical transceiver; a common sequence controller connected to the carrier band modem and the light waveguide sub-modem for controlling functions in the carrier band modem and the light waveguide sub-modem; and a return flow barrier connected between the optical transceiver and tghe light waveguide sub-modem for preventing received data from re-circulating through the optical transceiver and the light waveguide bus.

7 Claims, 6 Drawing Sheets

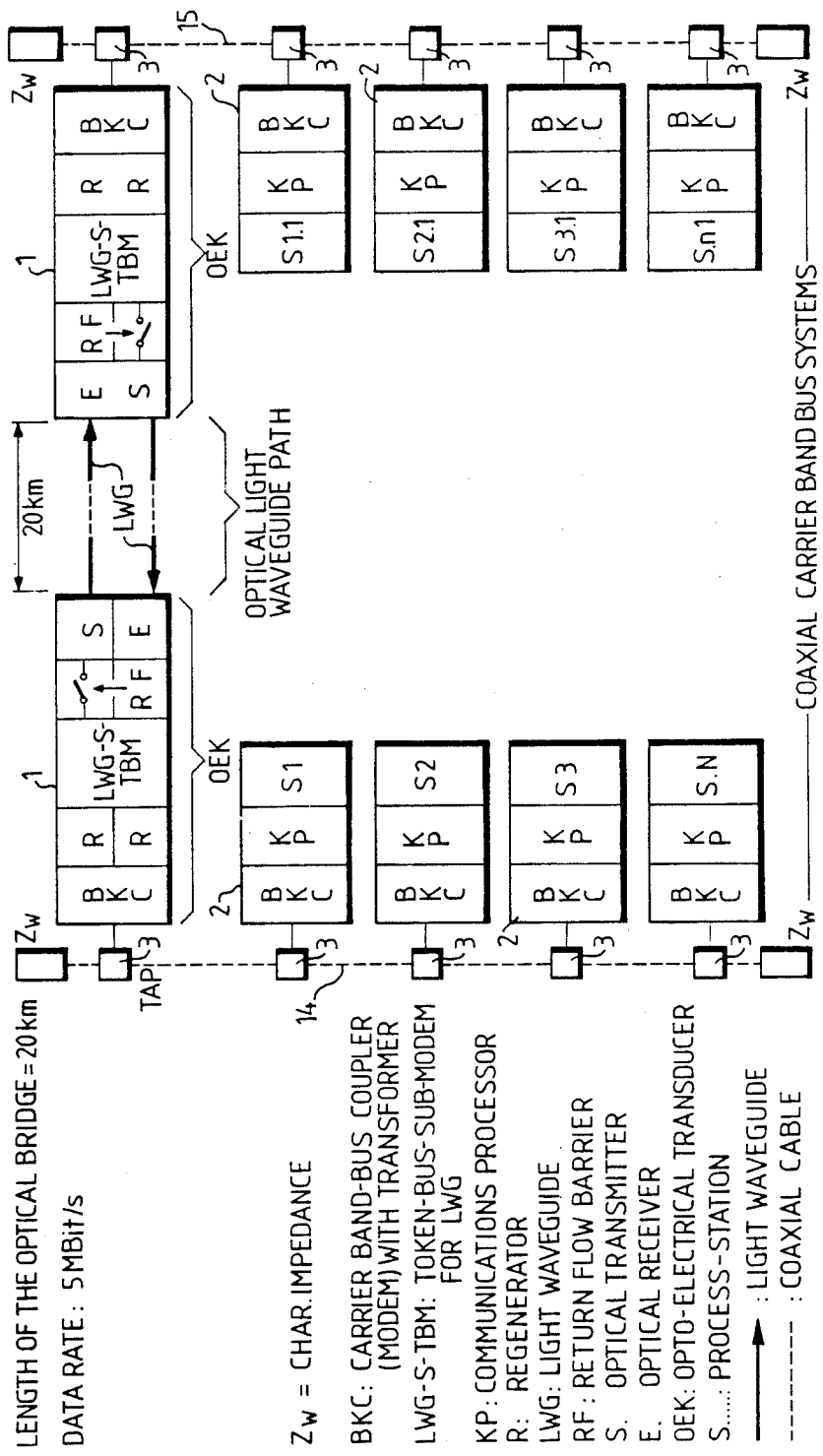

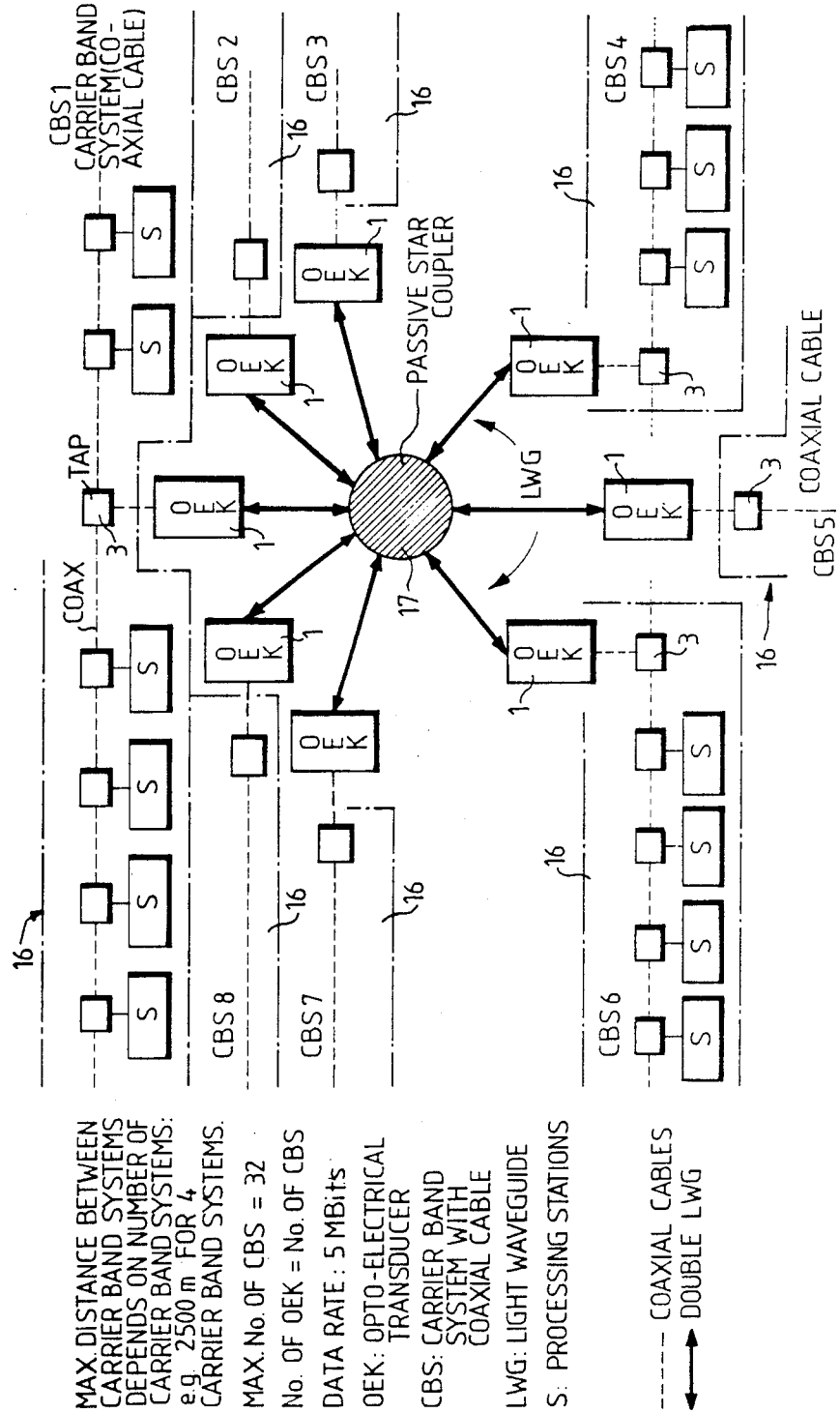

FIG.3 OPTICAL CONNECTION OF SEVERAL COAXIAL CABLE CARRIER BAND SYSTEM BY MEANS OF PASSIVE STAR COUPLER AND OPTO-ELECTRICAL TRANSDUCERS OEK

MAX. DISTANCE BETWEEN
CARRIER BAND SYSTEMS
DEPENDS ON NUMBER OF
CARRIER BAND SYSTEMS:
e.g. 2500 m FOR 4
CARRIER BAND SYSTEMS.

MAX. No. OF CBS = 32

No. OF OEK = No. OF CBS

DATA RATE: 5 MBits

OEK: OPTO-ELECTRICAL
TRANSDUCER

CBS: CARRIER BAND SYSTEM WITH
COAXIAL CABLE

LWG: LIGHT WAVEGUIDE

S: PROCESSING STATIONS

--- COAXIAL CABLES
⟷ DOUBLE LWG

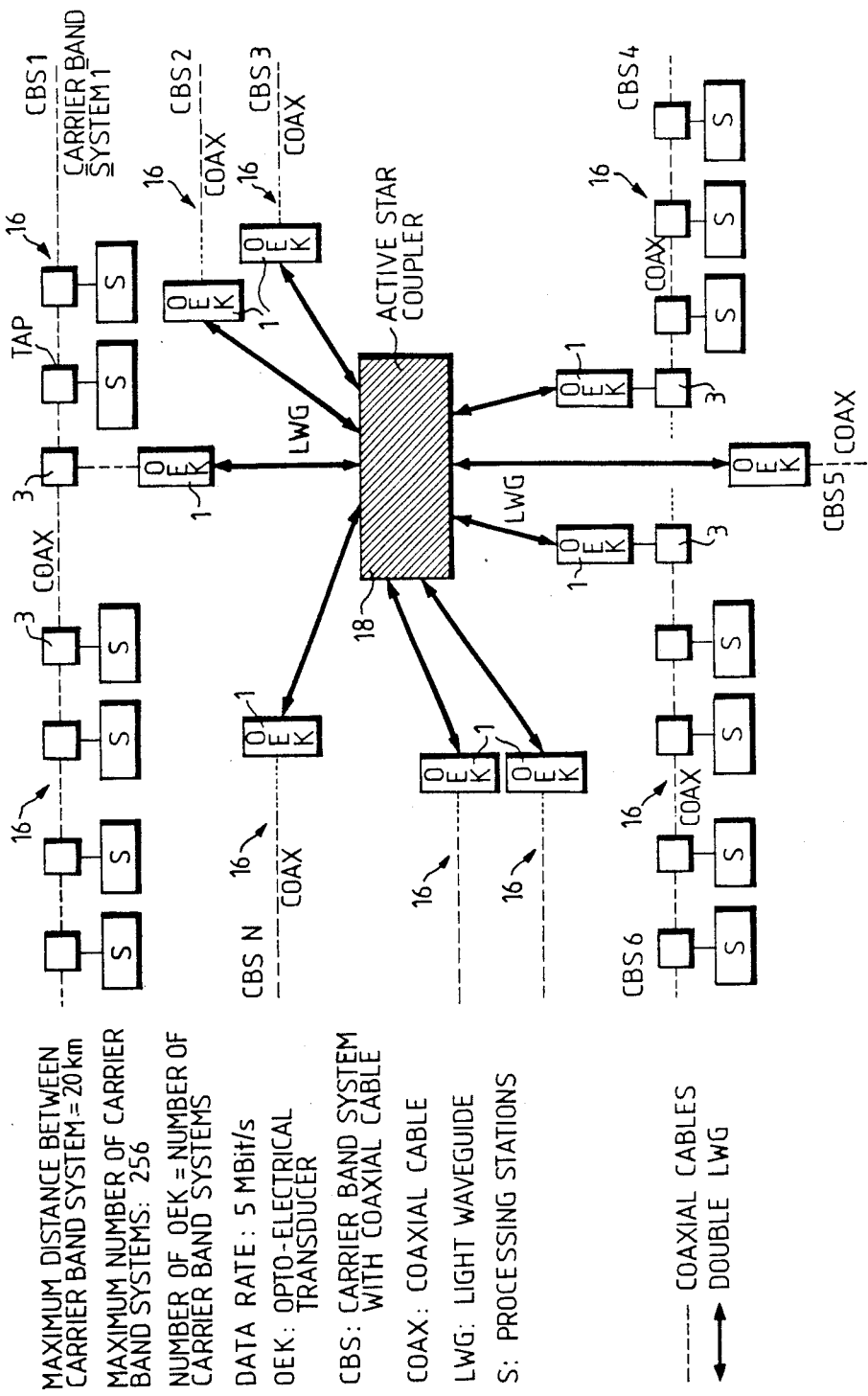

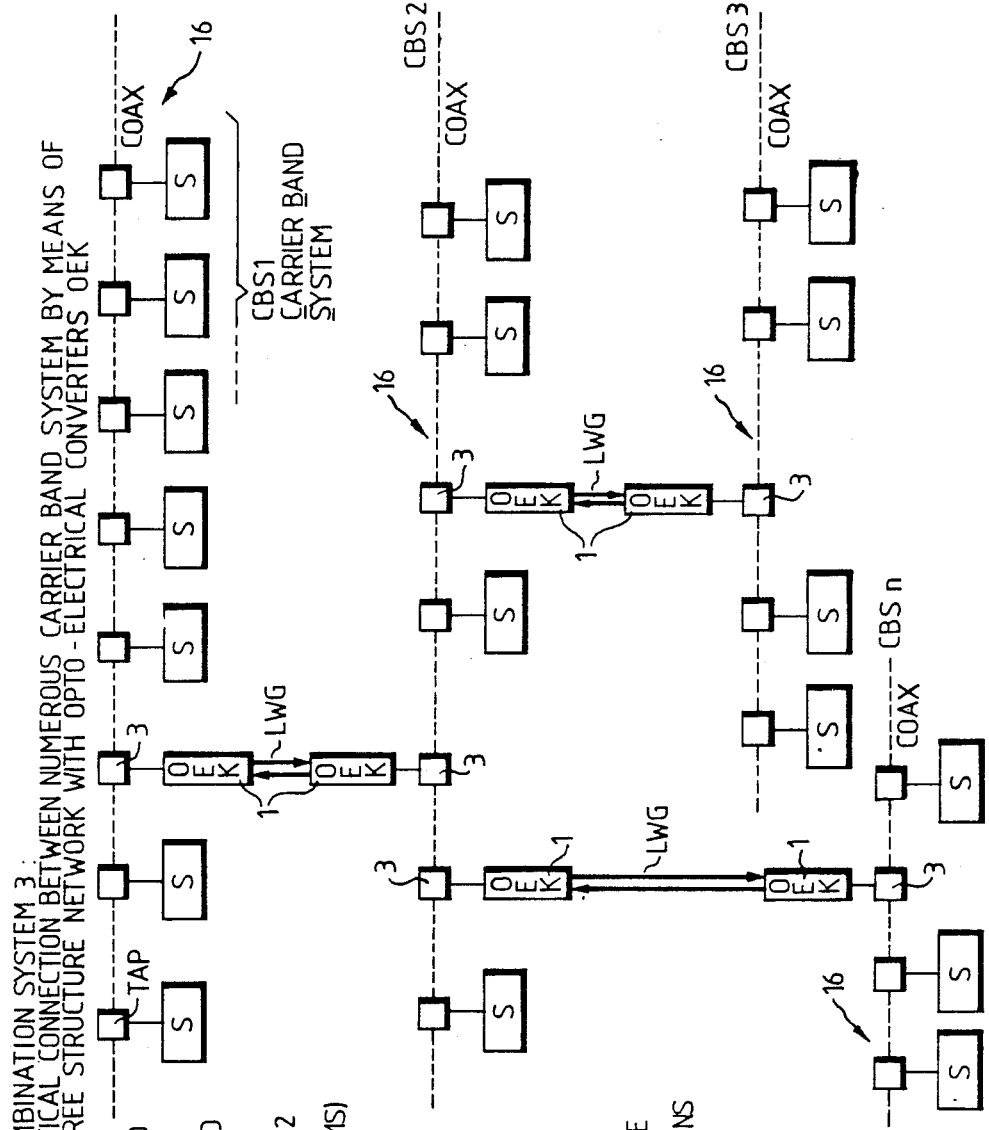

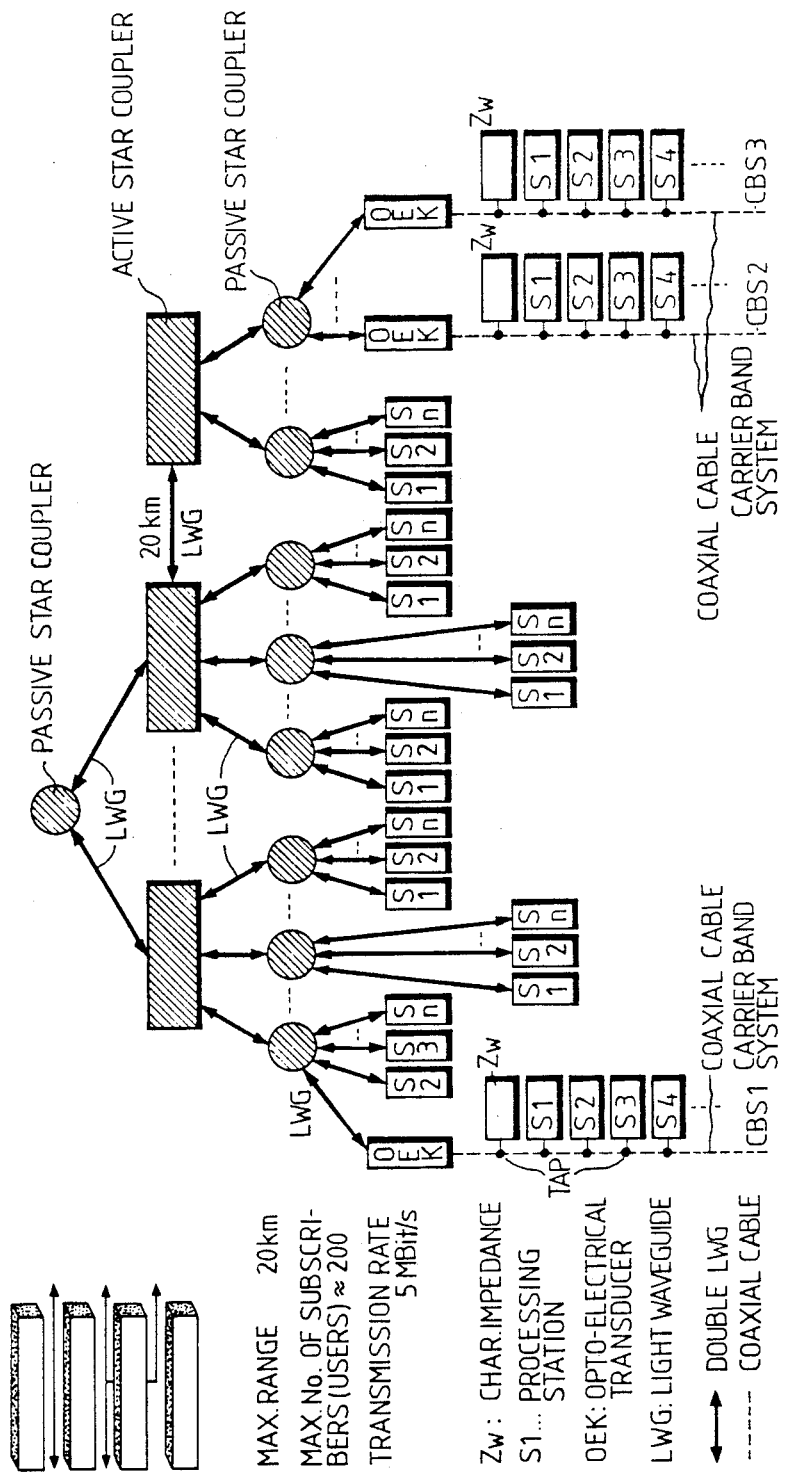

SYSTEM FOR CONNECTING LIGHT WAVEGUIDE BUSES AND COAXIAL CABLE BUSES

CROSS REFERENCE TO RELATED APPLICATION

This application claims the priority of Application Serial No. P 38 36 224.4, filed Oct. 25th, 1988, in the Federal Republic of Germany, the subject matter of which is incorporated herein by reference.

BACKGROUND OF THE INVENTION

The present invention relates to a system including connections between light waveguide buses (optical fiber buses) and coaxial cable buses operating according to the token passing principle (token bus). A system of this type is disclosed by M. Faugeras, C. Pontoise, F. J. Lecontein in an article entitled "Industrial LAN Using a Token Passing Bus Access Method With Optical Links," in EFOC/LAN 88. In this prior art system, carrier band coaxial cable buses are connected by way of electro-optical transceivers with, for example, an active optical star coupler. Two light waveguides are provided per transceiver for the purpose of transmitting and receiving. The transmit lightwave conductors of all transceivers are connected with a branch-off member in the star coupler, each by way of an optical transmitter. The star coupler and the branch-off member are connected with one another by a series connection of a carrier band demodulator and a carrier band modulator.

In the above-described prior art arrangement, the carrier band signals are fed to the light waveguides conforming in waveform and frequency. Therefore, the transmission distance is relatively short. Signal regeneration for analog signals is very difficult, especially with regard to high frequencies. Worldwide there is no signal regenerator available which would be suitable for signal transmission in the above described prior art arrangement, so that the prior art arrangement is not suitable for a large, spatial, distributed, local area network. For large, spatial, distributed, local area networks the optical segments of the networks are not in compliance with optical token bus standards.

SUMMARY OF THE INVENTION

It is an object of the present invention to develop a system with connections between light waveguide buses and coaxial cable buses which is suitable for carrier band buses and for light waveguide buses in a manufacturer-neutral way, i.e. with an open system architecture in compliance with electrical as well as optical token bus standards.

The above and other objects are accomplished in the context of a system for connecting light waveguide buses and coaxial cable buses operating according to the token passing principle, wherein the coaxial cable buses are each provided with electrical terminal access devices for transmitting electrical data signals into and receiving electrical data signals from the coaxial cable buses. According to the invention, the system is further provided with an opto-electrical converter disposed between a terminal access device and a light waveguide bus, such converter including:

- a carrier band modem connected to a terminal access device and having a standardized carrier band interface for producing data signals at the interface according to a predetermined token bus standard;
- an optical transceiver coupled to the light waveguide bus for converting electrical signals into optical signals and transmitting the optical signals onto the light waveguide bus and for receiving optical signals from the light waveguide bus and converting the optical signals into electrical signals;
- a light waveguide sub-modem having an interface coupled between the interface of the carrier band modem and the optical transceiver for generating electrical signals according to a predetermined optical token bus light waveguide standard and feeding the electrical signals to the optical transceiver and for generating electrical data signals according to the predetermined token bus standard from signals conforming to the predetermined optical token bus waveguide standard received from the optical transceiver;
- a common sequence controller connected to the carrier band modem and the light waveguide sub-modem for controlling functions in the carrier band modem and the light waveguide sub-modem; and
- a return flow barrier means connected between the optical transceiver and the light waveguide sub-modem for preventing received data from the optical transceiver from re-circulating through the optical transceiver and the light waveguide bus.

The system according to the invention thus realizes a bus concept which permits the selective use of light waveguide (LWG) and coaxial cable bus segments in one and the same network.

According to a further aspect of the invention, the electro-optical converter includes regenerators for regenerating the received signals of the carrier band system and converting them into suitable shape for optical transmission or transforming and regenerating the optically received signals into the carrier band specific form. According to yet a further feature of the invention a return flow barrier is provided in the converter to prevent signal loops.

In a preferred embodiment, the interfaces of the carrier band modem and of the light waveguide sub-modem are connected with one another by way of the regenerators which are controlled by a sequence controller. The regenerators may contain FIFO memories for both transmission directions.

According to another aspect of the invention, PAD-IDLE insertion circuits are provided for inserting preamble bits in the data which are lost in regeneration. A number of bits is disposed in the preambles of the data streams and can be supplemented if required. If the preamble is too short, plug bits are inserted so that the phase-lock-loop (PLL) circuits in the modem are able to build themselves up to the data stream.

The system according to the invention results in the following advantages:
- the coexistence of lightwave guides (LWG) and coaxial cable bus segments in the same network;
- compatibility with Manufacturing Automation Protocol (MAP) carrier band systems;
- integration of carrier band systems and LWG systems and LWG systems as sub-systems in a total system, with no devaluation of the coaxial carrier band systems;
- optical expandability of existing coaxial bus systems;
- modular structure with autonomous sub-systems;
- multifaceted, adaptable network technology, allowing for different network topologies;

setup of networks having large ranges and large numbers of subscribers;

solving of electromagnetic compatibility (EMC), grounding and lightning danger problems;

use of dual components and technologies, for example: LWG and coaxial technology; line and star topology; active and passive star couplers;

possibility of continuous transition from coaxial cable medium to the light waveguide medium; and use of coaxial bus segments in conformance with appropriate ISO DIS 8802.4 standard for token bus systems on a coaxial cable basis and light waveguide bus segments meeting the requirements for optical token bus systems according to IEEE 802.4.

Exemplary applications of the inventive system are:

bridging a region endangered by EMC problems, explosions or lightning strikes, for example when connecting to automation islands in different buildings of a factory complex;

the connection of carrier band systems in different mining shafts; and the connection of remote automation complexes (e.g. in the field of automatic clarification systems or in the chemical industry). Distances may go up to 20 km.

Many combination systems of local-area networks are possible with a hybrid structure according to the invention. The term hybrid structure as used herein is understood to mean networks including coaxial bus segments on a carrier band basis as well as light waveguide bus segments.

BRIEF DESCRIPTION OF THE DRAWINGS

The invention will now be described in greater detail with reference to embodiments illustrated in the drawing figures which will reveal further details, features and advantages of the invention.

FIG. 2 is a block circuit diagram including two coaxial cable carrier band systems which are coupled together by way of light waveguides according to the invention.

FIG. 3 is a block circuit diagram of a network including several coaxial cable carrier band systems connected with one another by passive star couplers according to a further aspect of the invention.

FIG. 4 is a block circuit diagram of a network including numerous carrier band systems which are connected with one another by means of at least one active star coupler according to another aspect of the invention.

FIG. 5 is a block circuit diagram of a network having a tree structure according to a further feature of the invention.

FIG. 6 is a block circuit diagram of a local-area MAP compatible bus system including light waveguide and coaxial cable segments in accordance with the principles of the invention.

DETAILED DESCRIPTION OF THE PREFERRED EMBODIMENTS

Figure 1:
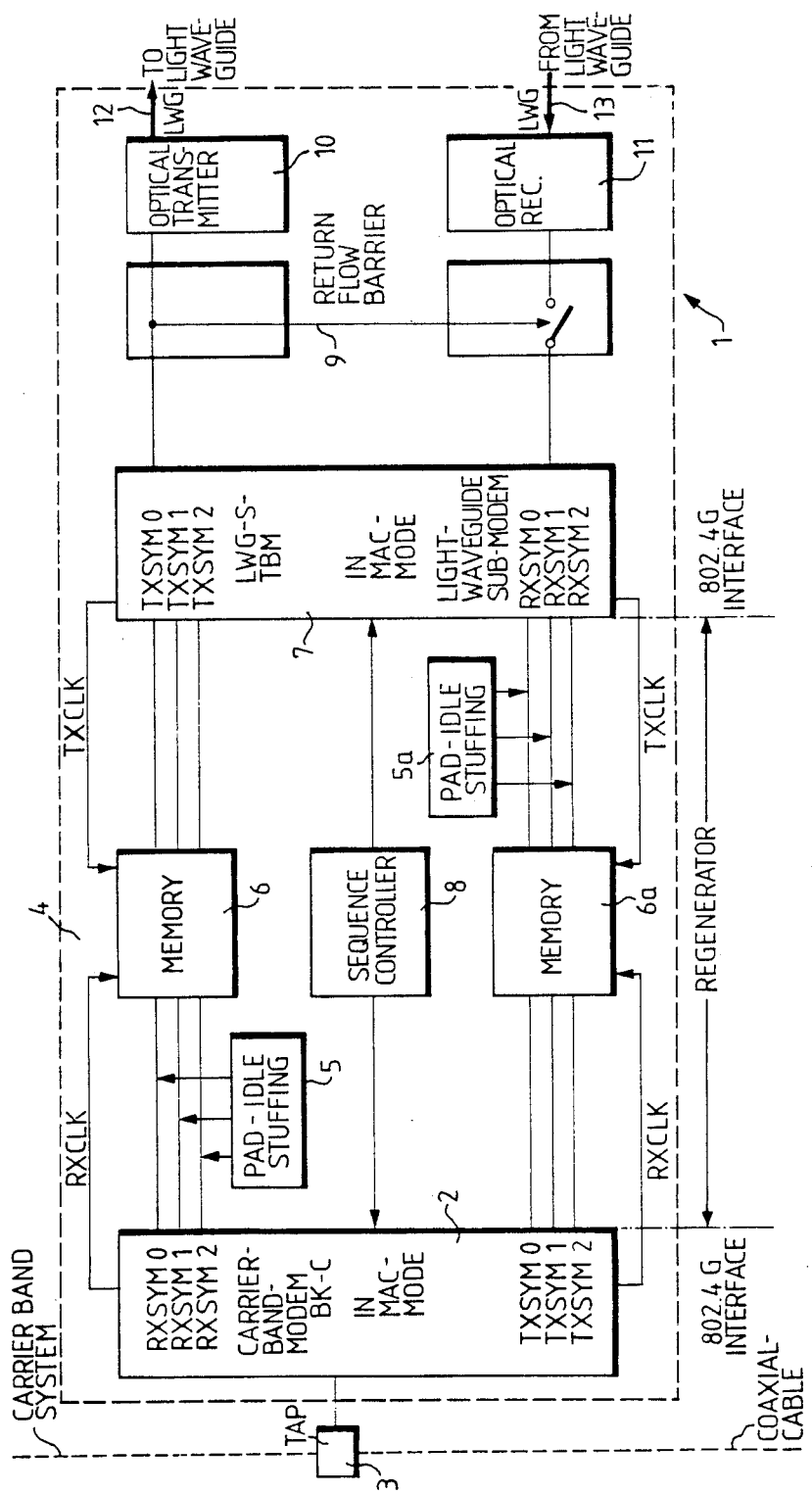
FIG. 1 is a block circuit diagram of an opto-electrical converter according to the invention.

Referring to FIG. 1, there is shown an opto-electrical converter (OEK) 1 including a carrier band modem 2 which is connected with a terminal access point (TAP) 3 of a carrier band coaxial cable bus depicted by the vertical dotted line on the left-hand side of the figure. OEK 1 serves to convert electrical carrier band signals into suitable optical signals and to reconvert them in the reverse direction. OEK 1 additionally serves to regenerate the signals as explained below.

For purposes of explaining the system of FIG. 1, it is assumed that data signals are to be transmitted from the carrier band system on the left of the drawing to a further carrier band system (not shown) to the right of the illustrated block circuit diagram.

Data are coupled from the carrier band system bus, with the aid of a commercially available terminal access tap 3 manufactured, for example, by RELOOM, Inc., type CBT-2020-4-FO0.5, into a first token bus carrier band modem 2, such as an Allen Bradley modem, Catalogue No. 6633-MAS, which serves as a carrier band bus coupler. Carrier band modem 2 has an 802.4G interface (meaning the interface complies with IEEE Standard 802.4G), at which signals are present as so-called "MAC" symbols, which would usually be transferred in a carrier band system to the medium access control layer of a communications processor. In the present system, however, they are fed to a regenerator 4 which regenerates the data.

Under certain circumstances, the MAC symbols may be missing a few preamble symbols, the "PAD-IDLE" symbols which always lead into telegraphic data and serve the receiver in the token bus modem circuit (BK-C) of carrier band modem 2 as a training sequence. The receiver in carrier band modem 2 must phase itself into the respective data pulses with the aid of a phase-lock-loop (PLL). Under certain circumstances, this may cause some of the first data pulses of a telegram to be lost. For further data transmission it is important that the telegram is equipped with a minimum number of preamble bits. The loss of preamble bits may be counteracted in the regenerator 4 by use of a bit stuffing circuit 5, also referred to as a PAD-IDLE stuffing circuit, with which an additional quantity of preamble bits is put ahead of the telegram.

The telegram arriving at the 802.4G interface of carrier band modem 2 is written into a first-in-first-out (FIFO) memory 6, and fed at the clock pulse rate of a second light waveguide token bus sub-modem 7, sometimes referred to herein as LWG-S-TBM 7, into this LWG-S-TBM 7, and from there coupled in an electrically predetermined form for the optical token bus light waveguide standard into an optical transmitter 10. The Fiber Optic Modem, Part No. MFV21A, manufactured by Computrol, Inc., may be used, for example, to implement light waveguide sub-modem 7. Optical transmitter 10 transmits the data into a light waveguide leading to another carrier band system. The clock pulse of the second LWG-S-TBM 7 is thus applicable for transmission in the light waveguide and is truly accurate so as to permit accurate regeneration in contrast to the clock pulse recovered in the first carrier band modem 2 by means of the PLL. The standard for optical token bus transmission is defined in the draft standard identified as IEEE 802.4. The coaxial cable bus systems meet the ISO DIS 8802/4 standard.

OEK 1 includes a sequence controller 8 to handle control functions in the carrier band modem 2 and in LWG-S-TBM 7. Controller 8 detects if data from transmission is waiting in carrier band modem 2 or in the light waveguide sub-modem 7 and completes all jobs which are waiting in the preliminary field of the transmission. The work resembles a communication controller's functions, which are performed if a modem is connected with a communication controller (according to IEEE 802.4). In addition, the controller 8 prepares the transmission in cooperation with carrier band modem 2 and the light waveguide sub-modem 7.

An optical receiver 11 is provided for receiving data transmitted by an opto-electrical converter of another carrier band system. In order to prevent received data which was transmitted from an opto-electrical converter of another carrier band system from circulating a second time through the optical connection or to enter the transmitting carrier band system, OEK 1 is equipped with a return flow barrier 9 which is disposed in front of optical transmitter 10 and optical receiver 11, each of which are connected, respectively, to transmitting and receiving light waveguides 12 and 13. For the reverse data transmission direction from the light waveguide to the carrier coaxial cable, data are processed according to standard in the corresponding form by means of a FIFO memory 6a and a PAD-IDLE bit stuffing circuit 5a. FIFO memories 6 and 6a may be implemented, for example, by the memory device manufactured by Integrated Device Technology Inc., as Part No. CMOS -Parallel-FIFO-1024X9 bit, IDT70-2SA/LA.

FIG. 2 shows the use of an OEK 1 in a basic application. Here, two coaxial carrier band buses 14 and 15 are connected with one another by means of a respective OEK 1 via an optical light waveguide path extending, for example, over 20 km. The coaxial carrier band buses 14 and 15 are linear in design. The terminal access points (TAP's) are coupled to the processing stations by means of identically constructed carrier band modems 2.

FIG. 3 shows an example of an expansion of the principle of FIG. 2. Several coaxial cable carrier band systems are coupled together by way of separate opto-electrical converters 1 and a common optical passive star coupler 17 such as the 4, 8, 12, 16 - port coupler manufactured by CANSTAR, Inc.

FIG. 4 shows an additional expansion of the system for significantly greater distances between carrier band systems. In this case, the coaxial carrier band systems 16 are connected with one another by means of individual OEK's 1 and an active optical star coupler 18. An active star coupler which may be used for this purpose is disclosed in International Application No. PCT/EP89/00156, filed Feb. 20th, 1989. The distances between carrier band systems realistically lie in a range of 20 km.

A network topology with tree structure is shown in FIG. 5. Here, different coaxial carrier band systems 16 are connected with one another by means of individual TAP's 3 and OEK's 1. The OEK's 1 permit optimum adaptation of the network topology to the spatial distribution of the subscriber stations.

FIG. 6 shows an example of the topology of a local-area network in which coaxial cable carrier band bus segments as well as light waveguide bus segments interact.

While a line structure is employed for the coaxial cable carrier band bus segments, the LWG networks each have a star structure. Active as well as passive star couplers serve to set up the LWG network structures. The network architecture of the expanded bus concept is modular, i.e. with a small number of sub-systems a multitude of combination systems can be constructed for which the system of FIG. 6 is only one of numerous possibilities.

With the above-described system, a transmission technology is made available which is compatible with the above-described expanded bus concept employing MAP communication architecture For MAP, there exists an official version MAP.30 (Manufacturing Automation Protocol), published by General Motors, 1988. As mentioned above, on the physical layer the token passing bus access method according to ISO DIS 8802/4 is employed.

Obviously, numerous and additional modifications and variations of the present invention are possible in light of the above teachings. It is therefore to be understood that within the scope of the appended claims, the invention may be practiced otherwise than as specifically claimed.

What is claimed is:

1. In a system for connecting light waveguide buses and coaxial cable buses operating according to the token passing principle, the coaxial cable buses each being provided with electrical terminal access means for transmitting electrical data signals onto and receiving electrical data signals from the coaxial cable bus, the improvement comprising:

an opto-electrical converter disposed between a terminal access means and a light-waveguide bus, said converter including:

carrier band modem means operatively connected to the terminal access means and having a standardized carrier band interface for producing data signals at said interface according to a predetermined token bus standard;

optical transceiver means coupled to the light waveguide bus for converting electrical signals into optical signals and transmitting the optical signals onto the light waveguide bus and for receiving optical signals from the light waveguide bus and converting the optical signals into electrical signals;

light waveguide sub-modem means having an interface, operatively coupled to the interface of said carrier band modem means and to said optical transceiver means, for generating electrical signals according to a predetermined optical token bus light waveguide standard and feeding the electrical signals to said optical transceiver means, and for generating electrical data signals according to the predetermined token bus standard from signals conforming to the predetermined optical token bus waveguide standard received from said optical transceiver means;

a common sequence controller operatively connected to said carrier band modem means and said light waveguide sub-modem means for controlling functions in said carrier band modem means and said light waveguide sub-modem means;

return flow barrier means operatively connected between said optical transceiver means and said light waveguide sub-modem means for preventing received data from the optical transceiver means from re-circulating through said optical transceiver means and the light waveguide bus; and regenerator means operatively connected between said carrier band modem means and said light waveguide sub-modem means and controlled by said sequence controller for regenerating the data signals from said carrier band modem means and said light waveguide sub-modem means.

2. A system as defined in claim 1, wherein said regenerator means include first and second FIFO memories each operatively connected between the interfaces of said carrier band modem means and said light waveguide sub-modem means.

3. A system as defined in claim 2, wherein said carrier band modem means and said light waveguide sub-modem means each have a clock pulse output, said first FIFO memory is operatively connected to the clock pulse output of said light waveguide sub-modem means for reading regenerated data into said light waveguide sub-modem means at the clock rate of said light waveguide sub-modem means, and said second FIFO memory is operatively connected to the clock pulse output of said carrier band modem means for reading out regenerated data to said carrier band modem means at the clock pulse rate of said carrier band modem means.

4. A system as defined in claim 1, wherein said regenerator means includes bit stuffing means for restoring preamble bits to a minimum number in the regenerated data signals for transmission from said light waveguide sub-modem means to said carrier band modem means and from said carrier band modem means to said light waveguide sub-modem means.

5. A system as defined in claim 1, further comprising: a plurality of carrier band buses each having at least one terminal access means; one of said opto-electrical converters operatively connected to at least one said terminal access means of each carrier band bus; and light waveguide means operatively connecting the opto-electrical converters associated with different carrier band buses.

6. A system as defined in claim 5, further comprising a passive star coupler, said light waveguide means operatively connecting said opto-electrical converters by way of said passive star coupler.

7. A system as defined in claim 5, further comprising an active star coupler, said light waveguide means operatively connecting said opto-electrical converters by way of said active star coupler.

* * * * *